United States Patent [19]

Snitzer et al.

[11] Patent Number: 4,637,025
[45] Date of Patent: Jan. 13, 1987

[54] SUPER RADIANT LIGHT SOURCE

[75] Inventors: Elias Snitzer, Wellesley; Shaoul Ezekiel, Medford, both of Mass.

[73] Assignee: Polaroid Corporation, Cambridge, Mass.

[21] Appl. No.: 663,345

[22] Filed: Oct. 22, 1984

[51] Int. Cl.⁴ .............................................. H01S 3/00
[52] U.S. Cl. ........................................... 372/1; 372/6; 350/96.34; 350/96.15
[58] Field of Search ................. 372/6, 1; 350/96.34, 350/96.15, 96.29, 96.30

[56] References Cited

U.S. PATENT DOCUMENTS

| | | | |
|---|---|---|---|
| 3,355,674 | 11/1967 | Hardy | 372/6 |
| 3,395,366 | 7/1968 | Snitzer et al. | 331/94.5 |
| 3,599,106 | 8/1971 | Snitzer | 330/4.3 |
| 3,808,549 | 4/1974 | Maurer | 372/6 |
| 3,826,992 | 7/1974 | Friedl | 372/6 |
| 3,894,857 | 7/1975 | Uchida et al. | 65/3 |
| 4,040,890 | 8/1977 | Burruss et al. | 372/6 |
| 4,120,587 | 10/1978 | Vali et al. | 372/6 |
| 4,553,238 | 11/1985 | Shaw et al. | 372/6 |

OTHER PUBLICATIONS

"Fibre Lasers and Dispersion in Fibres" by E. Snitzer, published by IPC Science and Technology Press.

Primary Examiner—Leon Scott, Jr.
Attorney, Agent, or Firm—David R. Thornton

[57] ABSTRACT

A super-radiant light source having an output with a low temporal coherence well suited, for example, to optical inertial sensor applications, includes a single mode optical waveguide such as an optical fiber having its core doped with an active laser material, such as neodymium. Pump light is coupled into the optical fiber at an intensity sufficient to produce a significant amplification of the spontaneous emission. The reflectivity at the exit end of the fiber is low enough so that even with a high gain for the light in one traverse through the fiber, the fiber is operated well below threshold for laser oscillation. The resulting emission is of high intensity, but has a low temporal coherence. In one form, the pump light is coupled into one end of the fiber and a dichroic filter is interposed in the light path between the pump light and the optical fiber to pass pump light into the core and reflect the spontaneous emission of the active material back into the core and toward the output.

24 Claims, 3 Drawing Figures

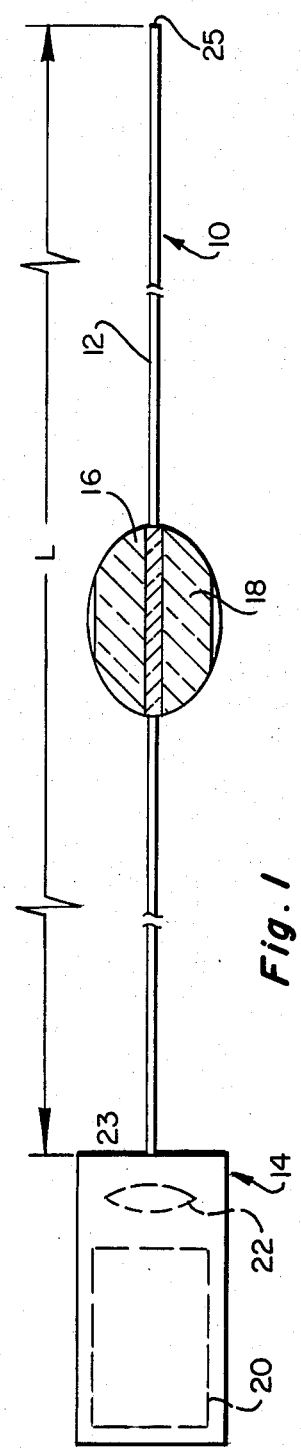
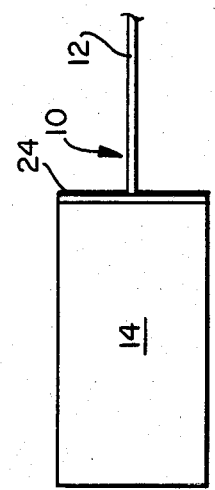
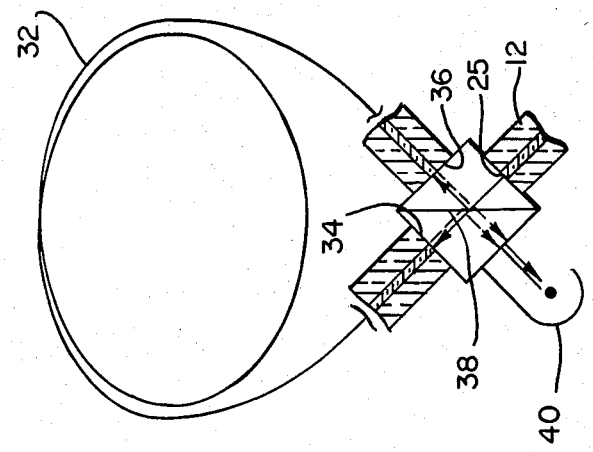

SUPER RADIANT LIGHT SOURCE

BACKGROUND OF THE INVENTION

This invention relates to light sources. More particularly, it relates to a light source having a relatively high light output and a low temporal coherence.

Light emitting diodes (LED's) and semiconductor laser diodes are representative of light sources currently used for introducing light energy into an optical fiber. In light emitting diodes, photons of a characteristic wavelength are emitted when electrons and holes recombine across a forwardly biased junction defined by semiconductors of opposite conductivity type. The wavelength of the emitted photons is distributed in a generally Gaussian manner about a central wavelength determined by the nature of the semiconductor materials, their dopants and the temperature. Since the electron/hole recombinations occur randomly, the light output is essentially incoherent, that is, the light output has very low temporal coherence. Light emitting diodes are suitable for use as light sources in some optical fiber systems, since their small size allows convenient coupling to an optical fiber core and they can be switched fast enough to be useful for many digital data transmission applications. However, the radiant intensity of the light provided by most LED's, even the so-called super-radiant LED's, is generally insufficient for many optical fiber applications, including some optical fiber gyroscopes. In addition, the wavelength of the light produced by LED's is temperature dependent, this aspect limiting their use to applications where wavelength stability is not a primary consideration.

Semiconductor laser diodes, in contrast to LED's, include structure that defines a resonant cavity in which light emitted along a principal axis can oscillate within the boundaries of the cavity to create a standing wave pattern that causes stimulated light energy emission. The light output exiting one end of the cavity has a high radiant intensity and temporal coherence as well as a narrow spectral line width compared to the light output of an LED. Like the LED, the wavelength of the light output of a laser diode can be temperature dependent.

The laser diode is well suited for optical fiber communication systems because of its high light output. However, the relatively high temporal coherence of the laser diode light output, as well as the narrow spectral line width, can cause undesirable scattering effects, including interference effects from Rayleigh back scatter. One optical fiber device in which interference with scattered light is not desirable is the optical gyroscope. In an optical gyroscope, a two-port optical fiber circuit is provided in which light energy from a common source is inputted into each port to provide counter-travelling light paths. The light energy output at each end of the optical fiber is then compared to determine the phase difference between the counter-travelling paths. Where the system is subjected to a relative spatial rotation at some rate, the effective path length of one of the light paths appears longer and the effective path length of the other of the light paths appears shorter to provide an apparent relative path length difference. The apparent path length difference can be detected by observing the phase difference of the light propagation that are representative of the angular rate. Since the phase differences are small, any interference effects due to scattered light can obscure the rate-dependent phase difference information.

Where an LED is utilized as the light source for an optical fiber gyroscope, the radiant intensity of the light energy, after it is coupled into the fiber circuit, is low enough such that a high noise-to-signal ratio exists which can make difficult the detection of very low angular rates, as the information bearing signal can be obscured by noise. On the other hand, where a laser diode is utilized as the light source, the relatively high temporal coherence combined with the characteristically narrow spectral line width can produce various types of interference between the primary beams and the scattered light that can likewise make interpretation of the rate signal difficult. With a super radiant LED, the light intensity coupled into a single mode fiber is higher than with an ordinary LED, but is not as high as with a laser diode and, furthermore, has temporal coherence which tends to be intermediate in value between an LED and laser diode. Additionally, the temperature dependence of the wavelength of the output of an LED, super radiant LED or laser diode does not contribute to optimum device operation.

As can be appreciated, a need exists for a light source that is small in size, has a high radiant intensity output, a relatively low temporal coherence, and smoothly distributed line-free and temperature independent spectral characteristics to provide a light source well suited for many applications, such as in equal path interferometers, of which the fiber optic gyroscope is an example.

SUMMARY OF THE INVENTION

In accordance with the present invention, a light source includes an optical waveguide, preferably a single-mode optical fiber, having a fiber portion overlapping mode propagation doped with an active laser material, such as neodymium, which is capable of absorbing light energy at one wavelength and emitting light at another emitting wavelength. A pumping light source, such as a laser diode, is coupled to an input port of the optical waveguide with the pump light level controlled so that the active laser material emits light, predominantly by light amplification by stimulated emission of the spontaneous emission, but having a relatively low temporal coherence because of the low reflectivity at the exit end of the optical fiber. A frequency selective reflector may be provided in the light path between the pumping laser diode and the optical fiber core with transmission characteristics to pass the pump light into the core while reflecting light emitted by the active material back into the core toward the output end of the fiber to thereby increase the radiant intensity of the light output. A light source in accordance with the present invention may be as small as two to three microns in diameter, and produces light energy having a radiant intensity much higher than that of an LED, a low temporal coherence, and a smooth structure-free wavelength distribution that is largely temperature independent.

A principal objective of the present invention is, therefore, the provision of an improved light source for application in optical fiber systems and devices. Other objects and further scope of applicability of the present invention will become apparent from the detailed description to follow, taken in conjunction with the accompanying drawings, in which like parts are designated by like reference chracters.

BRIEF DESCRIPTION OF THE DRAWINGS

FIG. 1 is a diagrammatic side view of a light source in accordance with the present invention;

FIG. 2 is a side view of a variation of the light source of FIG. 1; and

FIG. 3 is a plan view, in schematic form, of an optical fiber gyroscope utilizing the light sources illustrated in FIGS. 1 and 2.

DESCRIPTION OF THE PREFERRED EMBODIMENT

A light source in accordance with the present invention is illustrated in FIG. 1 and designated generally therein by the reference character 10. The light source 10 includes an optical waveguide such as an optical fiber 12 of selected length "L" (e.g., 2–20 cm.) and a pump light assembly 14 for introducing pump light into the optical fiber 12, as later described.

In one embodiment, the optical fiber 12 includes a core 16 fabricated from a host glass doped with an active laser material and a cladding 18 that surrounds the core. Alternatively, the cladding can contain the actual laser material in a thin layer adjacent to the core so that the single mode light distribution overlaps the active material. The preferred active material is neodymium, although other rare earth materials including ytterbium and erbium are likewise suitable. The concentration of the dopant in the host glass can vary from a lower limit determined by convenience in length to absorb the pump light and to avoid light loss from excessive lengths required for the particular application and an upper limit determined by concentration quenching. In general, a concentration range between 0.1 and 30% (by weight) is suitable. The preferred host glasses include the alkali, alkaline earth silicates, although other silicates, germinates, phosphates, and some borate glasses are likewise suitable. The index of refraction of the core 16 is selected to be higher than that of cladding 18 so that the pumping light introduced into the core and light emitted by the active material is contained within or in the vicinity of the core. The diameter "D" of the core 16 is determined, in part, by the particular application, that is, the diameter of optical fiber into which the light output of the light source 10 is introduced. In general, the diameter of the core 10 should be the minimum necessary into which pump light can be efficiently coupled for the particular application to maximize the radiant energy emitted per unit area for a particular pumping light energy level. Thus, where the light source 10 is to supply light to a single-mode optical fiber or device, the diameter of the core 16 is selected to give single-mode light transmission at the emission wavelength. For a single mode transmission, the diameter of the core depends on the indices of refraction of the core and cladding; a diameter of 1–20 microns, or even up to 50 microns, for wavelengths in the near infrared and visible region of the light spectrum can provide single-mode transmission. If desired, the diameter of the core 16 can be larger than the minimum for the particular application. For example, where the light source 10 is to be coupled to a single-mode optical fiber having a core diameter of 4 microns, the core 16 can have a somewhat larger diameter, e.g., 6 microns, to facilitate coupling. In general, for a circular cross-section for the core, the core size is determined by making $(\pi d/\lambda)NA$ equal to or less than 2.4 where: d is the core diameter, $\lambda$ is the wavelength of the emitted light, and NA is the numerical aperture which is related to the indices of refraction of the core and cladding, $n_1$ and $n_2$, by NA equals $(n_1{}^2 - n_2{}^2)^{\frac{1}{2}}$.

The pumping light assembly 14, in the preferred embodiment, includes a light source, such as a laser diode 20, a lens 22 or equivalent device for directing the light output of the laser diode into one end 23 of the optical fiber. The efficient introduction of pumping light from the laser diode 20 into the core 16, can also be accomplished using a longitudinal, parabolic-index, self-focusing fiber lens, a transverse fiber lens, or by providing a spherical end on the core 16. Where the output of the pumping laser diode 20 is sufficiently high, the laser diode can be coupled directly to the core 16.

The laser diode 20 is selected to have a light output at a wavelength within the one of the absorption bands of the particular active material, viz., 0.78, 0.82 or 0.88 microns where the active material is neodymium. The typically high intensity output of the laser diode 20 is passed through the lens 22 and into the core 16 of the optical fiber 12. As the light enters the core 16, the active material absorbs photons with concomitant excitations to higher electron energy states. The length "L" of the core 16 is selected so that substantially all the photons of the pumping light from the pumping laser diode 20 will be absorbed by the active laser material and will not be transmitted through to any output end 25 thereof. As is known, the excited electrons will effect emissive transitions to lower states and eventually return to their ground state with the emission of photons at characteristic emission bands, or fluorescing wavelengths; principally 1.06 microns and 1.35 microns in the case of neodymium. Since the transitions to the ground state for spontaneous emission occur in a random manner, the photon emissions for amplified spontaneous emission are essentially an amplified replication of spontaneous fluorescence to provide light generation that is temporally incoherent. The wavelength of the emitted, low coherence light is distributed about a principal wavelength determined by the emission characteristics of the active material and any wavelength dependent characteristics of the fiber. The intensity of the pumping light is preferably such that a population inversion does occur thereby presenting conditions conducive to amplified spontaneous emission rather than spontaneous emission without stimulated emission of the spontaneous fluorescent light. The light energy available at the output port of the optical fiber has a high radiant intensity compared to the output of LED's, a wavelength distribution broader than the characteristic spectral line output of a laser diode, a low temporal coherence, and a principal wavelength that is generally temperature independent. Since the output port is defined in the form of an optical fiber, the light source 10 is well suited for butt coupling to other optical fibers and devices or for use with other fiber-to-fiber couplers or connectors.

A variation of the light source 10 of FIG. 1 is illustrated in FIG. 2 and designated generally therein by the reference character 10'. The structure of the light source 10' is the same as that of the light source 10 of FIG. 1 except for a dichroic reflector 24 located between the lens 22 and the core 16. The characteristics of the reflector 24 are selected so that the pumping light is transmitted through the reflector 24 into the active material doped core 16 to generate temporally incoherent light as described above. The reflector 24 reflects light energy generated in the core 16 back into the core to increase light output. While reflection occurs at one end of the core 16, conditions conducive to laser oscillation are not present so that conditions conducive to light generation by amplified spontaneous emission are preserved.

The light sources 10 and 10' of FIGS. 1 and 2 are well suited for application in various optical fiber systems and devices. One such device is the optical gyroscope, illustrated in schematic form in FIG. 3 and designated generally therein by the reference character 30. A full disclosure of optical gyroscopes and related ring interferometers may be found in U.S. Pat. No. 4,013,365 to Vali et al, the disclosure of which is incorporated herein by reference. As shown in FIG. 3, the optical gyroscope 30 includes at least one coil or loop of an optical fiber waveguide 32 with the respective ends 34 and 36 of the loop defining input/output ports. The ends 34 and 36 are positioned on opposite sides of a beam splitter 38. A light source in accordance with the present invention, such as the light source 10' of FIG. 2, is positioned to direct light into the beam splitter 38 while a detector 40 is positioned to receive light energy from the beam splitter.

In operation, the high radiant intensity, low temporal coherence output of the light source 10 is directed into the beam splitter 38 which transmits a portion of the light into the end 34 and reflects the remaining portion into the end 36 to provide two counter travelling light beams in the optical waveguide 32. The clockwise travelling light beam exits the end 36 and passes through the beam splitter 38 to the detector 40. In a like manner, the counterclockwise travelling beam exits the end 34 and is reflected into the detector 40 by the beam splitter 38. When the system of FIG. 3 is subjected to a relative spatial rotation, the effective path length of one of the two counter travelling light beams will appear longer while that of the other will appear shorter to produce an apparent path length difference. The detector 40 is effective to receive the combined beams of the clockwise and counterclockwise light paths and detect any phase shift differences developed as a result of spatial rotation in the plane of the optical fiber waveguide. The phase shifts are representative of displacements between the two counter travelling light beams and are representative of relative spatial rotations.

In the application of FIG. 3, the light source of the present invention provides a high radiant intensity that permits the determination of small angular rates and of high rotation rates with high precision. The low temporal coherence and smoothly distributed, structure free wavelength characteristics of the output light avoid interference effects due to scattering that can make difficult the identification of the intelligence bearing signal. Additionally, the relative temperature independence of the output, when compared to semi-conductor LED's and laser diodes, contributes to optimum device operation.

In addition to the aforementioned laser diode, various pump sources including laser-type sources, for example, a krypton ion laser, and non-lasing sources can be applicable for providing pump power. Lateral coupling of the pump power to the waveguide, while somewhat less efficient utilization of pump power, can also be employed. One end of the waveguide or fiber can be made reflective while the output end provides minimal reflectivity. For example, the output end of the fiber segment may be cleaved at an angle, coated with antireflection coating or immersed in index matching fluid, etc.

Thus, it will be appreciated from the above that as a result of the present invention a highly effective light source suited for use in optical fiber sytems and devices is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A light source comprising:
   an optical waveguide having a core and cladding and including active material positioned to overlap propagating modes of the waveguide, said material absorbing light of at least one wavelength and emitting light of at least one other wavelength; and
   means for directing pump light energy from a source providing said one wavelength into said waveguide at an input location for absorption by said material, the intensity of the directed light being sufficient to cause an amplified spontaneous emission by said material from an output location of said waveguide.

2. The light source of claim 1 wherein said optical waveguide is an optical fiber.

3. The light source of claim 1 wherein said core has a diameter of less than twenty microns.

4. The light source of claim 1 wherein said material is a rare earth ion.

5. The light source of claim 4 wherein the percentage concentration by weight of said material is between 0.1 and 30%.

6. The light source of claim 1 wherein said optical waveguide is an optical fiber and said material is neodymium.

7. The light source of claim 6 wherein said pump light source provides pump light at wavelengths that include 0.78, .0.82, or 0.88 microns.

8. The light source of claim 1 wherein said material is selected from the group consisting of neodymium, terbium, and erbium.

9. The light source of claim 1 wherein said core is fabricated from an alkali, alkaline earth silicate and said material is selected from the group consisting of neodymium, ytterbium, and erbium.

10. The light source of claim 1 wherein the distance between said locations of said optical waveguide is a selected length sufficient to absorb substantially all the pump light provided by said directing means in advance of said output location.

11. The light source of claim 10 wherein said optical waveguide is an optical fiber of said selected length and said input and output locations are opposite ends of said fiber.

12. The light source of claim 10 wherein said selected length is between two and twenty centimeters.

13. The light source of claim 10 wherein said pump light is introduced into one end of said optical waveguide and a wavelength selective reflector arrangement is interposed between said means for directing pump light and said one end of said optical waveguide for passing pump light to said optical waveguide while reflecting light energy emitted in said core back into said core.

14. The light source of claim 13 wherein said wavelength selective reflector comprises a dichroic filter.

15. A light source comprising:
   an optical fiber of finite length having a first and a second end and having a core and cladding, said fiber including active material positioned to overlap propagating modes of said fiber, and said material absorbing light of at least one wavelength and emitting light of at least one other wavelength; and
   means for directing pump light from a source of said one wavelength into said fiber near a first end thereof for absorption by said material, the intensity of the pump light being sufficient to cause amplified spontaneous emission by said material from said second end.

16. The light source of claim 15 wherein said core has a diameter of less than twenty microns.

17. The light source of claim 16 wherein said optical fiber has a length greater than two centimeters.

18. The light source of claim 15 wherein said one end is reflective and said other end is non-reflective.

19. An intensely bright, essentially point source of light comprising:
   an optical fiber of selected length that includes a core surrounded by a cladding having an index of refraction greater than that of said core, said core having a diameter of less than twenty microns and said fiber being at least in part doped with an active laser material; and
   means for directing pump light from a source having a given wavelength within the absorption band of said material into said core at one location for absorption by said active laser material, the intensity of the pump light being sufficient to cause said active laser material to emit predominately incoherent light from said core at another location spaced from said first location.

20. The point source of light of claim 19 wherein said optical fiber is sufficiently long to absorb substantially all the pump light provided by said directing means in advance of said another location.

21. The point source of light of claim 20 wherein said space between the input and output locations is between two and twenty centimeters.

22. The point source of light of claim 20 wherein said optical fiber is a single mode optical fiber.

23. A light source for an optical gyroscope of the type that includes an optical fiber circumscribing a space, means for dividing the light from a light source into counter travelling light beams within said fiber, and means for detecting differences between the counter travelling light beams, said light source comprising:
   a single-mode optical fiber having a core and cladding, said fiber including active laser material positioned to overlap the propagating single mode of the fiber; and
   means coupled to said fiber for pumping light from a source into said fiber for absorption by said active laser material, the intensity of the pumping light being sufficient to cause amplified spontaneous emission by said active material from a remote end of said fiber.

24. A method of producing intense light having low temporal coherence, said method comprising the steps of:
   providing an optical waveguide having a core and cladding, said fiber including an active material that absorbs light at one wavelength and emits light at another wavelength; and
   pumping light of said one wavelength at a given location into said fiber for absorption by the material to thereby emit light at the other wavelength, the intensity of the pumping light controlled to cause emission of substantially amplified spontaneous light from another location in said fiber remote from said given location.

* * * * *

(12) EX PARTE REEXAMINATION CERTIFICATE (6146th)
United States Patent
Snitzer et al.

(10) Number: US 4,637,025 C1
(45) Certificate Issued: Mar. 11, 2008

(54) SUPER RADIANT LIGHT SOURCE

(75) Inventors: Elias Snitzer, Wellesley, MA (US); Shaoul Ezekiel, Medford, MA (US)

(73) Assignee: JDS Uniphase Corporation, San Jose, CA (US)

Reexamination Request:
No. 90/007,395, Jan. 27, 2005

Reexamination Certificate for:
Patent No.: 4,637,025
Issued: Jan. 13, 1987
Appl. No.: 06/663,345
Filed: Oct. 22, 1984

(51) Int. Cl.
*H01S 3/00* (2006.01)

(52) U.S. Cl. .................... 372/1; 372/6; 385/33; 385/147

(58) Field of Classification Search ............. None
See application file for complete search history.

(56) References Cited

U.S. PATENT DOCUMENTS 4,515,431 A 5/1985 Shaw et al.

OTHER PUBLICATIONS

*LASERS*, edited by Albert K. Levine, vol. 2, Chapter 2—Glass Lasers, by E. Snitzer and C.G. Young, pp. 191–256, 1968.

*Journal of Applied Physics*, vol. 37, No. 12, Nov. 1966, article entitled, "Optical Avalanche Laser," by C.G. Young, et al., at pp. 4319–4324.

*Applied Optics*, Jun. 1974, vol. 13, No. 6, article by J. Stone and C. A. Burrus, entitled "Neodymium–Doped Fiber Lasers: Room Temperature cw Operation With An Injection Laser Pump," at pp. 1256–1258.

*Applied Physics Letters*, vol. 41, No. 7, Oct. 1982, article by Wang, et al., entitled "High–power low divergence super-radiance diode," at pp. 587–589.

*Primary Examiner*—Minh Nguyen

(57) ABSTRACT

A super-radiant light source having an output with a low temporal coherence well suited, for example, to optical inertial sensor applications, includes a single mode optical waveguide such as an optical fiber having its core doped with an active laser material, such as neodymium. Pump light is coupled into the optical fiber at an intensity sufficient to produce a significant amplification of the spontaneous emission. The reflectivity at the exit end of the fiber is low enough so that even with a high gain for the light in one traverse through the fiber, the fiber is operated well below threshold for laser oscillation. The resulting emission is of high intensity, but has a low temporal coherence. In one form, the pump light is coupled into one end of the fiber and a dichroic filter is interposed in the light path between the pump light and the optical fiber to pass pump light into the core and reflect the spontaneous emission of the active material back into the core and toward the output.

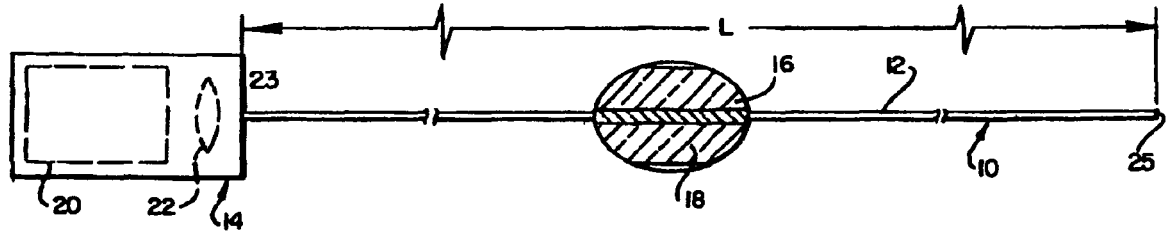

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–24 are cancelled.

\* \* \* \* \*